(12) United States Patent
Hayashida et al.

(10) Patent No.: US 8,001,698 B2
(45) Date of Patent: Aug. 23, 2011

(54) DIGITAL DISPLACEMENT MEASURING INSTRUMENT

(75) Inventors: Shuji Hayashida, Kawasaki (JP); Masahiko Tachikake, Kure (JP); Yuji Fujikawa, Kure (JP)

(73) Assignee: Mitutoyo Corporation, Kawasaki-shi (JP)

( * ) Notice: Subject to any disclaimer, the term of this patent is extended or adjusted under 35 U.S.C. 154(b) by 24 days.

(21) Appl. No.: 12/453,427

(22) Filed: May 11, 2009

(65) Prior Publication Data
US 2009/0282689 A1  Nov. 19, 2009

(30) Foreign Application Priority Data
May 13, 2008  (JP) .................................. 2008-126116

(51) Int. Cl.
*G01B 3/18* (2006.01)
(52) U.S. Cl. ......................................................... 33/518
(58) Field of Classification Search .................... 33/819, 33/813, 818, 494, 679.1
See application file for complete search history.

(56) References Cited

U.S. PATENT DOCUMENTS

| | | | | |
|---|---|---|---|---|
| 706,242 | A | * | 8/1902 | Latshaw ........................ 33/494 |
| 809,950 | A | * | 1/1906 | Heysinger et al. ............. 33/494 |
| 870,403 | A | * | 11/1907 | Woerner ........................ 33/818 |
| 1,594,862 | A | * | 8/1926 | Unverferth ..................... 33/494 |
| 1,776,245 | A | * | 9/1930 | Barrett ........................... 33/494 |
| 2,829,439 | A | * | 4/1958 | Cunningham .................. 33/818 |
| 3,092,913 | A | * | 6/1963 | Bugge ........................... 33/818 |
| 3,750,296 | A | * | 8/1973 | Kindl et al. .................... 33/816 |
| 3,787,982 | A | * | 1/1974 | Anderson ...................... 33/818 |
| 4,255,861 | A | * | 3/1981 | Nakata et al. ................... 33/819 |
| 4,443,945 | A | * | 4/1984 | Takemura et al. .............. 33/819 |
| 4,496,865 | A | * | 1/1985 | Allen et al. .................... 310/80 |
| 5,337,488 | A | * | 8/1994 | Lemelson ....................... 33/784 |
| 6,519,867 | B1 | * | 2/2003 | Saeki ............................. 33/813 |
| 7,020,979 | B2 | * | 4/2006 | Hayashida et al. ............. 33/813 |
| 2009/0113734 | A1 | * | 5/2009 | Matsumiya et al. ............ 33/505 |

FOREIGN PATENT DOCUMENTS
JP   U-54-117168   8/1979
JP   A-11-287602  10/1999
* cited by examiner

*Primary Examiner* — Christopher Fulton
(74) *Attorney, Agent, or Firm* — Oliff & Berridge, PLC

(57) ABSTRACT

A digital displacement measuring instrument detects a displacement of a spindle by an encoder and then displays the displacement on a digital display unit. With an imaginary base line centered along an axial direction of an outer circumference of a sleeve, a millimeter graduation for displaying the displacement of the spindle in millimeters is provided on one side, and the inch graduation for displaying the displacement of the spindle is provided on the other side.

2 Claims, 9 Drawing Sheets

| SCREW PITCH (mm) | INCH GRADUATION POSITION | | | | | | | | | | UNIT |
|---|---|---|---|---|---|---|---|---|---|---|---|
| | 0.1 | 0.2 | 0.3 | 0.4 | 0.5 | 0.6 | 0.7 | 0.8 | 0.9 | 1 | INCH READING POSITION(′) |
| | 2.54 | 5.08 | 7.62 | 10.16 | 12.7 | 15.24 | 17.78 | 20.32 | 22.86 | 25.4 | MILLIMETER EQUIVALENT(mm) |
| 0.5 | 5.08 | 10.16 | 15.24 | 20.32 | 25.4 | 30.48 | 35.56 | 40.64 | 45.72 | 50.8 | NUMBER OF ROTATION (ROTATION) |
| | 28.8 | 57.6 | 86.4 | 115.2 | 144 | 172.8 | 201.6 | 230.4 | 259.2 | 288 | ANGLE TO ORIGIN(°) |

| SCREW PITCH (INCH) | MILLIMETER GRADUATION POSITION | | | | | UNIT |
|---|---|---|---|---|---|---|
| | 5 | 10 | 15 | 20 | 25 | MILLIMETER READING POSITION(mm) |
| 0.025 | 0.20 | 0.39 | 0.59 | 0.79 | 0.98 | INCH EQUIVALENT (INCH) |
| | 7.87 | 15.75 | 23.62 | 31.50 | 39.37 | NUMBER OF ROTATION (ROTATION) STARTING FROM ORIGIN |
| | 314.65 | 269.29 | 223.94 | 178.58 | 133.23 | ANGLE TO ORIGIN(° ) |

(NOTE: ROUND OFF TO TWO DECIMAL PLACES)

DIGITAL DISPLACEMENT MEASURING INSTRUMENT

BACKGROUND OF THE INVENTION

1. Field of the Invention

The present invention relates to a digital displacement measuring instrument for measuring a dimension and the like of an object to be measured based on an axial displacement of a spindle. More specifically, the invention relates to a digital micrometer and a digital micrometer head and the like.

2. Description of Related Art

A graduation-reading micrometer (see, for instance, JP-UM-A-54-117168) and a digital display micrometer (see, for instance, JP-A-11-287602) are typically known.

In the graduation reading micrometer, a screw of millimeter specification (e.g., a screw of 0.5 mm pitch: referred to as a millimeter screw hereinafter) is used in a millimeter reading micrometer, and a screw in inch specification (e.g., a screw of 0.635 mm pitch: referred to as an inch screw hereinafter) is used in an inch reading micrometer. A displacement of a spindle can be read by a sleeve graduation axially provided on an outer circumference of a sleeve and a thimble graduation circumferentially provided on an outer circumference of a thimble.

However, such a graduation as used in the graduation reading micrometer is not required in the digital display micrometer since a displacement of a spindle is detected by a rotary sensor and the like and a detected value is converted into a value in millimeter or inch unit before being digitally displayed. Accordingly, in the digital display micrometer, a reading model in millimeter or inch unit can be provided only with a metric screw.

However, there is a potential error in the digital micrometer on account of electric external noise according to used environment. Accordingly, it is often requested to provide a graduation on a digital micrometer for confirmation sake.

In accordance with recent improvement in reliability of sensors, the graduation is not required to provide the same resolution as a graduation-reading micrometer, where it is sufficient in most cases that the digitally displayed value is confirmed to be consistent with the displacement of the thimble (or displacement of the spindle) at several check points.

Under these circumstances, in order to provide a graduation on a digital micrometer, a millimeter screw and an inch screw are typically used respectively for millimeter-reading and inch-reading models, which, however, requires separate production processes to result in increase in production cost.

Similarly, a millimeter graduation and an inch graduation are axially provided on an outer circumference of the sleeve respectively for millimeter-reading and inch-reading models, which also requires separate production processes and accompanies increase in production cost.

Further, in a digital display that can switch a display mode thereof between a millimeter display and an inch display, when only one of millimeter and inch graduations is provided, the displacement of the spindle cannot be checked by the graduation, which hinders operativity.

SUMMARY OF THE INVENTION

An object of the invention is to provide a digital displacement measuring instrument that is adapted to provide a millimeter-reading and inch-reading model with a single type of screw, whereby the production cost can be reduced and the operativity can be improved.

A digital displacement measuring instrument of the invention includes: a main body; a spindle that has a screw screwed in the main body to be displaced in an axial direction; an encoder that detects a displacement of the spindle; a digital display unit; a display controller that converts the displacement of the spindle detected by the encoder either to a millimeter unit or to an inch unit and displays a converted displacement on the digital display unit; a sleeve that is fixed on the main body to receive the spindle therein; and a thimble that is fitted over the sleeve and is connected to the spindle, in which a millimeter graduation that displays the displacement of the spindle by the millimeter unit and an inch graduation that displays the displacement of the spindle by the inch unit are axially provided on an outer circumference of the sleeve.

According to the arrangement of the invention, as the thimble is rotated, the spindle connected to the thimble is rotated to be displaced in the axial direction. A screw in millimeter pitch is used as the screw of the spindle. Accordingly, when the spindle is rotated once, the spindle is displaced in the axial direction by the millimeter pitch of the screw.

When the spindle is displaced, the displacement of the spindle is detected by the encoder to be subsequently displayed on the digital display unit. In a reading model that displays the displacement of the spindle in the axial direction on the digital display unit in millimeters, the displacement of the spindle is displayed on the digital display unit in millimeters. In a reading model in inch unit that displays the displacement of the spindle in the axial direction on the digital display unit in inches, the displacement of the spindle is displayed on the digital display unit in inches.

Additionally, as the spindle is displaced, the thimble is also moved to the axial direction of the sleeve. Since the millimeter graduation and the inch graduation are both axially provided on the outer circumference of the sleeve, the displacement of the spindle can be read in millimeters and in inches. In other words, in the millimeter reading model, the displacement of the spindle can be read in millimeters by a certain millimeter graduation on the sleeve at which the thimble is positioned. In the inch reading model, the displacement of the spindle can be read in inches by a certain inch graduation on the sleeve at which the thimble is positioned.

Thus, in any reading models or even a display-switching model, the displacement of the spindle can be read in millimeters and in inches by the millimeter graduation and the inch graduation axially provided on the outer circumference of the sleeve. Accordingly, whether the display on the digital display unit is erroneous can be checked by confirming whether a value read from the graduations and a value displayed on the digital display unit are the same. Consequently, since a millimeter-reading or inch-reading model or a display-switching model can be produced with a single type of screw, the production cost can be reduced and the operativity can be improved.

In the digital displacement measuring instrument of the invention, it is preferable that an imaginary base line axially extending on the outer circumference of the sleeve is interposed between the millimeter graduation and the inch graduation.

Especially, it is preferable that the millimeter graduation and the inch graduation are provided on the same side of the outer circumference of the sleeve as the digital display unit is provided.

According to this arrangement, since the imaginary base line extending along the axial direction of the outer circumference of the sleeve is interposed between the millimeter graduation and the inch graduation, these graduations are easily recognized. Especially, when the millimeter graduation and the inch graduation are provided on the same side as the digital display unit, the millimeter graduation and the inch graduation are more easily recognized.

In the digital displacement measuring instrument of the invention, it is preferable that an inch reading thimble graduation that represents a rotary angle position of the thimble relative to a starting position is circumferentially provided on the outer circumference of the thimble, the rotary angle position corresponding to a decimal part less than an integer of a rotation number of the spindle when the spindle is axially displaced in a predetermined inch pitch.

According to this arrangement, when the spindle is displaced in the axial direction by a predetermined inch pitch, e.g. 0.1 inch (converted value in mm: 2.54 mm), the spindle is rotated corresponding to the displacement of the spindle in the axial direction.

For example, when a 0.5 mm pitch screw is used, the spindle is rotated "5.08" times. The inch reading thimble graduation is provided at a position of an angular pitch of "28.8 degree", which corresponds to "0.08" of a decimal part less than an integer in the rotation of the spindle, along the axial direction on the outer circumference of the thimble. Accordingly, when the thimble is moved near "0.1" inch of the inch graduation and subsequently the inch reading thimble graduation corresponding to the position of "28.8 degree" from the starting position is aligned with the base line of the sleeve, the spindle is moved by 0.1 inch.

Thus, an erroneous display on the digital display unit can be reliably checked using the inch graduation and the inch reading thimble graduation by confirming whether a displayed value on the digital display unit matches with a displacement represented by the graduation when the spindle is moved in a predetermined inch pitch.

In the digital displacement measuring instrument of the invention, it is preferable that a base mark that meets the imaginary base line when the thimble is rotated integer times is provided on the outer circumference of the thimble.

According to this arrangement, the displacement of the spindle can be accurately read from the millimeter graduation when the base mark is aligned with the imaginary base line on the outer circumference of the sleeve. In other words, reading accuracy can be further improved in this arrangement than an arrangement having no base mark of the thimble.

In the digital displacement measuring instrument of the invention, it is preferable that at least one of the millimeter graduation and the inch graduation includes a plurality of major graduations and sub-graduations, the major graduations being provided with figures representing the displacement at every several intervals, and the sub-graduations equidistantly disposed between the major graduations becoming longer toward the major graduations.

According to this arrangement, at least one of the millimeter graduation and the inch graduation is provided with the major graduations representing the displacement at every several intervals. Accordingly, when, for instance, checking whether the display of the digital display unit is erroneous by positioning the thimble at one of the major graduations, the thimble is easily positioned at the major graduation.

DETAILED DESCRIPTION OF PREFERRED EMBODIMENT(S)

Figure 1:
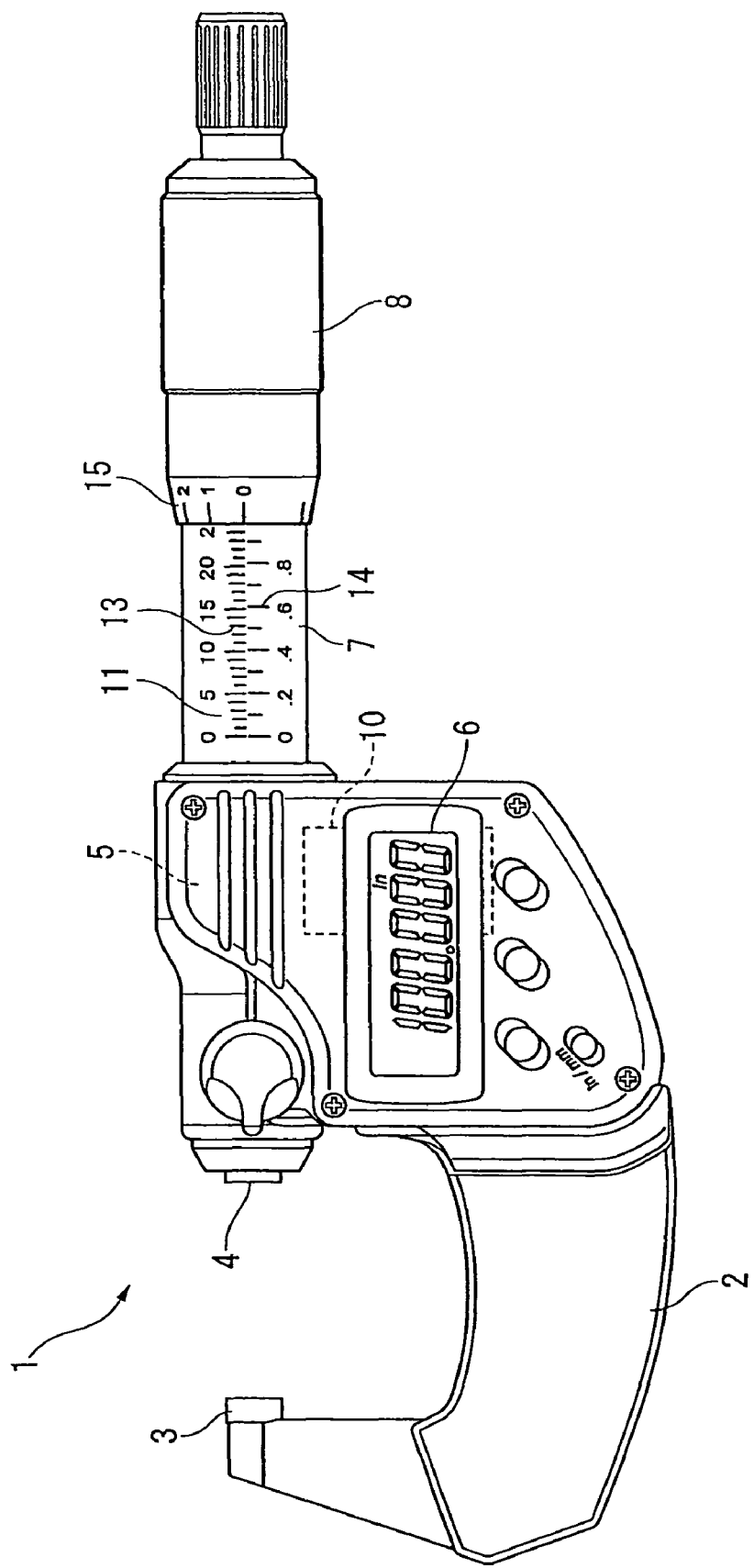
FIG. 1 is a front elevation of a digital display micrometer according to a first exemplary embodiment of the invention.
Figure 2:
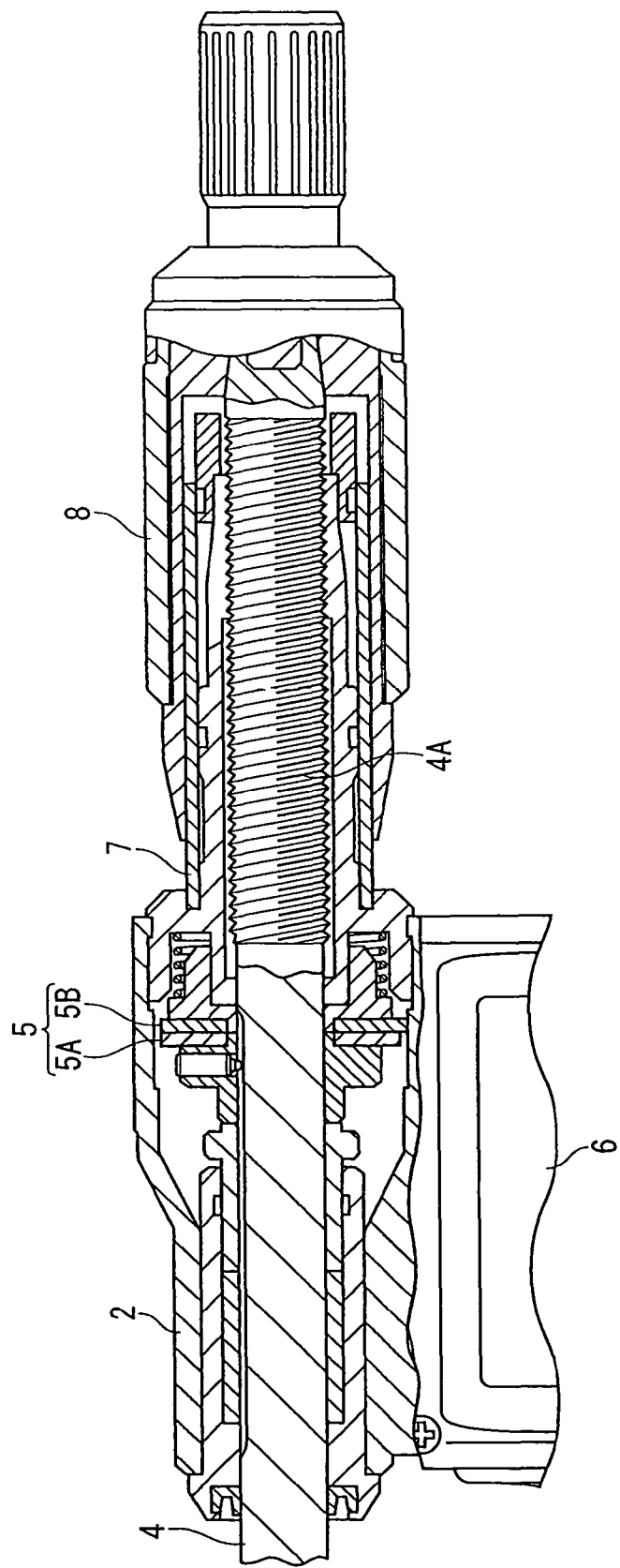
FIG. 2 is a partial cross section of the above exemplary embodiment.

An exemplary embodiment of the invention will be described below with reference to drawings.
<Overall Structure (see FIGS. 1 and 2)>
FIG. 1 is a front elevation of a digital display micrometer according to a first exemplary embodiment and FIG. 2 is a partial cross section thereof.

In FIG. 1, a digital micrometer 1 includes: a main body 2 in a substantially U-shape; an anvil 3 fixed on one end of the main body 2; a spindle 4 displaced in a direction toward and away from the anvil 3, the spindle 4 being screwed on the other end of the main body 2; an encoder 5 that detects a displacement of the spindle 4; a digital display unit 6; a display controller 10 that converts the displacement detected by the encoder 5 either to millimeter unit or to inch unit and displays a converted displacement on the digital display unit 6; a sleeve 7 fixed on the main body 2 and receiving the spindle 4 therein; and a thimble 8 fitted over the sleeve 7 and connected to the spindle 4.

As shown in FIG. 2, the spindle 4 is integrated with a screw 4A on a side inserted to the main body 2. A screw in millimeter pitch is used as the screw 4A. A screw of 0.5 mm in pitch is used in this exemplary embodiment.

The encoder 5 is an electrostatic encoder, which includes a rotor 5A that is rotated integrally with the spindle 4 and a stator 5B fixed on the body 2 and opposing the rotor 5A at a predetermined space. The stator 5B is fixed inside the body 2.

Figure 3:
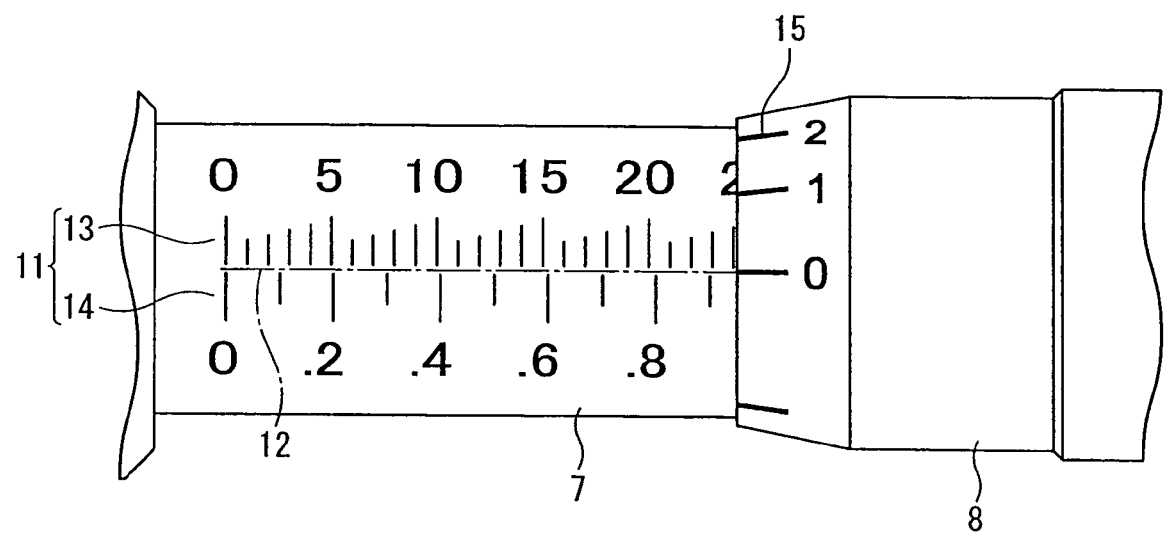
FIG. 3 is a drawing showing a sleeve graduation and a thimble graduation of the above exemplary embodiment.

The displacement of the spindle 4 detected by the encoder 5 is displayed in millimeter unit or in inch unit on the digital display unit 6.
<Sleeve Graduation (see FIG. 3)>
As shown in FIG. 3, a sleeve graduation 11 is provided along an axial direction on an outer circumference of the sleeve 7. An imaginary line 12 is axially defined on the outer circumference of the sleeve 7 on the same side as the side of the body 2 provided with the digital display unit 6. The sleeve graduation 11 includes: a millimeter graduation 13 in a predetermined millimeter pitch axially provided on one side (an upper side of the sleeve 7 seen from the front side) of the imaginary base line 12; and an inch graduation 14 in a predetermined inch pitch axially provided on the other side (a lower side of the sleeve 7 seen from the lower side) of the imaginary base line 12. Incidentally, the imaginary base line 12 along the outer circumference is an imaginary line between the millimeter graduation 13 and the inch graduation 14, and is not actually marked as a line.

The millimeter graduation 13 includes a plurality of major graduations and sub-graduations marked according to a thimble position when the spindle 4 rotates even times. In other words, the millimeter graduation 13 is axially provided in 1 mm pitch on the outer circumference of the sleeve 7. The major graduations of the millimeter graduation 13 are provided with figures representing the displacement in millimeter, the figure being marked at every several intervals from starting position "0", e.g., at every five lines. In other words, figures "5", "10", "15", "20" . . . are respectively attached at the major graduations of the fifth, tenth, fifteenth, twentieth . . . lines from the starting position "0."The lengths of the sub-graduations equidistantly disposed between the major graduations become gradually longer toward the major graduation, i.e. in a stepped manner.

The inch graduation 14 includes a plurality of major graduations and sub-graduations marked according to the thimble position when the spindle 4 moves in the axial direction in a predetermined inch pitch. Herein, the inch graduation 14 is axially provided in 0.1 mm pitch on the outer circumference of the sleeve 7. The major graduations of the inch graduation 14 are provided with figures representing the displacement in inches, the figure being marked at every 0.2 inch pitch. In other words, figures "0.2", "0.4", "0.6", "0.8" . . . are respectively provided on the major graduations of the second, fourth, sixth, eighth . . . lines from the starting position "0."

<Inch Reading Thimble Graduation (see FIGS. 3 to 5)>

As shown in FIG. 3, an inch reading thimble graduation 15 is provided along an axial direction on an outer circumference of the thimble 8. The inch reading thimble graduation 15 represents a rotary angle position of the thimble 8 relative to the starting position, corresponding to a decimal part less than an integer of the number of rotation of the spindle 4 when the spindle 4 is displaced along the axial direction in a predetermined inch pitch.

A fractionated angle of the inch reading thimble graduation 15 for matching a displayed value on the digital display unit 6 with a read graduation (the inch graduation 14 and the inch reading thimble graduation 15) is calculated by the following formula.

Thimble graduation position (the number of rotation
from the starting position)=Inch reading position
(converted value in mm)/Screw pitch of the
spindle (mm)

Figures 4, 5:
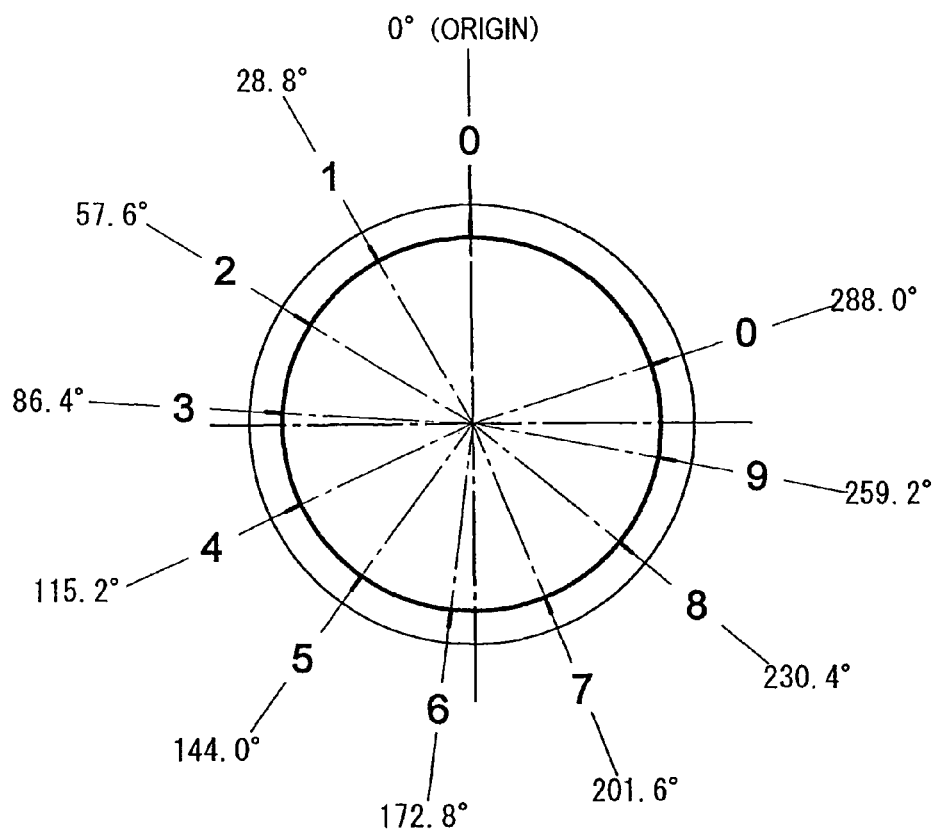
FIG. 4 is a drawing showing an inch graduation position of the above exemplary embodiment.
FIG. 5 is a drawing illustrating a thimble graduation of the above exemplary embodiment.

According to the formula, FIG. 4 shows an inch reading thimble graduation position (an angle from the starting position) in an inch graduation position when a screw pitch of the screw 4A of the spindle 4 is 0.5 mm.

In the above exemplary embodiment, as shown in FIG. 5, the inch reading thimble graduation 15 is provided in an angular pitch of 28.8 degree along the axial direction on the outer circumference of the thimble 8. The inch reading thimble graduation 15 is denoted with a sequential integer from 1, i.e., "1", "2", "3", . . . in every angular pitch of 28.8 degree from the starting position "0."

<Confirmation of Millimeter Display (see FIGS. 6 and 7)>

In order to confirm an erroneous display of a millimeter displayed value on the digital display unit 6, confirmation is made at several points where the spindle 4 is displaced in the axial direction.

Figure 6:
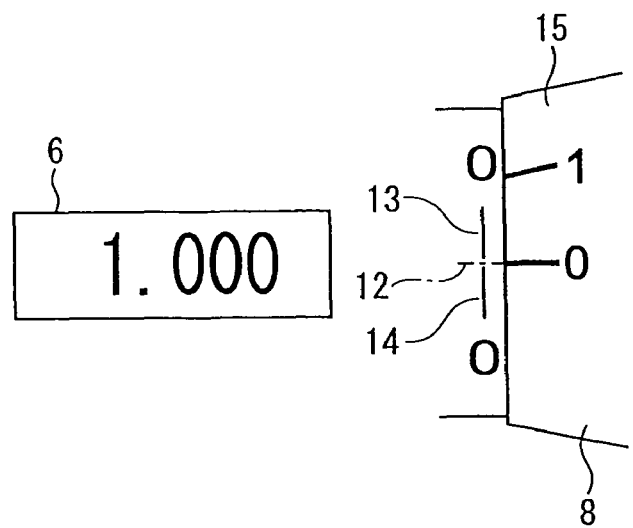
FIG. 6 is a drawing showing that a spindle is displaced in 1 mm in the above exemplary embodiment.

For example, as shown in FIG. 6, the thimble 8 is rotated twice to meet "0" of the inch reading thimble graduation 15 to the imaginary base line 12 corresponding to the position "1" of the millimeter graduation 13. In other words, the spindle 4 is displaced for 1 mm. At this time, it is judged that there is no erroneous display when the displayed value of the digital display unit 6 is "1.000" mm. Otherwise, it is judged that the displayed value is erroneous.

Figure 7:
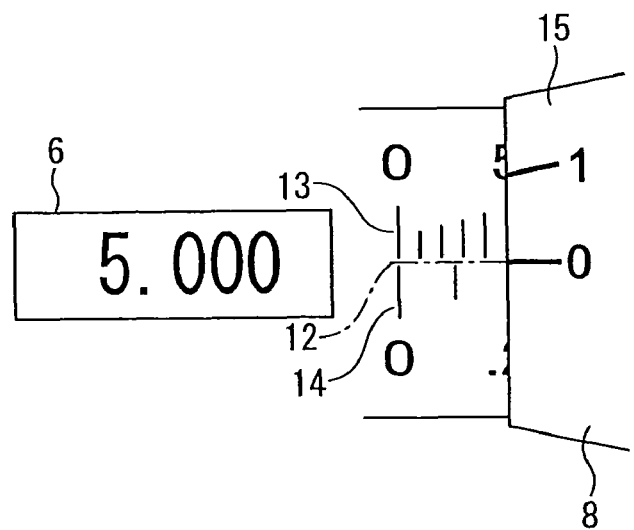
FIG. 7 is a drawing showing that a spindle is displaced in 5 mm in the above exemplary embodiment.

Moreover, as shown in FIG. 7, the thimble 8 is rotated ten times to meet "0" of the inch reading thimble graduation 15 to the imaginary base line 12 corresponding to the position "5" of the millimeter graduation 13. In other words, the spindle 4 is displaced for 5 mm. At this time, it is judged that there is no erroneous display when the displayed value of the digital display unit 6 is "5.000" mm. Otherwise, it is judged that the displayed value is erroneous.

<Confirmation of Inch Display (see FIGS. 8 and 9)>

In order to confirm an erroneous display of an inch displayed value in the digital display unit 6, confirmation is similarly made at several points where the spindle 4 is displaced in the axial direction.

Figure 8:
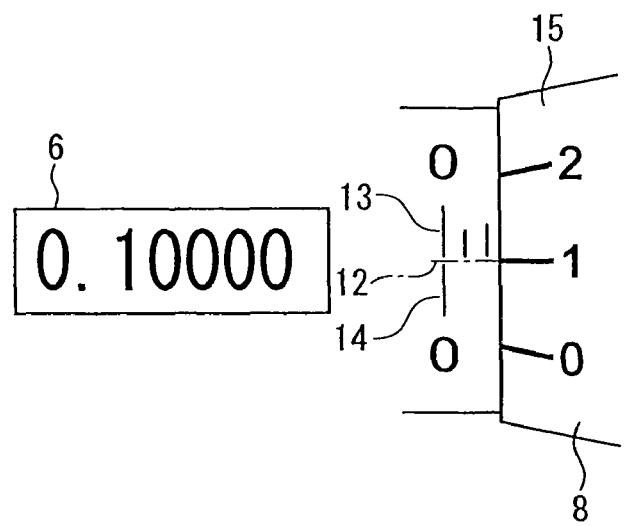
FIG. 8 is a drawing showing that a spindle is displaced in 0.1 inch in the above exemplary embodiment.

For example, as shown in FIG. 8, the thimble 8 is rotated five times and further rotated at a predetermined angle to meet "1" of the inch reading thimble graduation 15 to the imaginary base line 12 corresponding to the position "0.1" of the inch graduation 14. In other words, the spindle 4 is displaced for 0.1 mm. At this time, it is judged that there is no erroneous display when the displayed value of the digital display unit 6 is "0.10000" inch. Otherwise, it is judged that the displayed value is erroneous.

Figure 9:
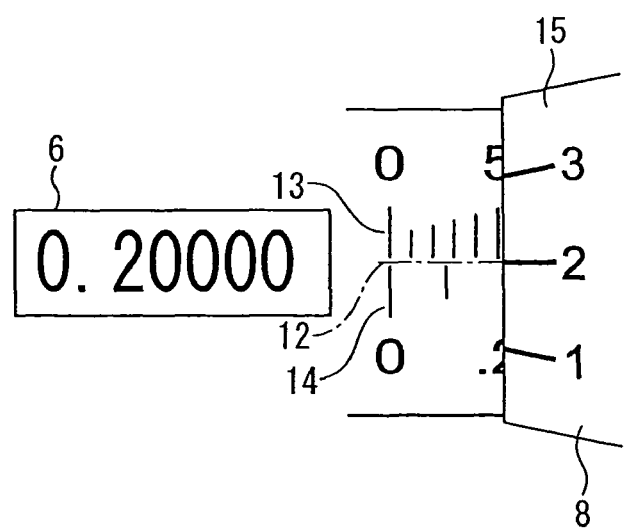
FIG. 9 is a drawing showing that a spindle is displaced in 0.2 inch in the above exemplary embodiment.

Moreover, as shown in FIG. 9, the thimble 8 is rotated ten times and further rotated at a predetermined angle to meet "2" of the inch reading thimble graduation 15 to the imaginary base line 12 corresponding to the position "0.2" of the inch graduation 14. In other words, the spindle 4 is displaced for 0.2 mm. At this time, it is judged that there is no erroneous display when the displayed value of the digital display unit 6 is "0.20000" inch. Otherwise, it is judged that the displayed value is erroneous.

Accordingly, a reading model in millimeter and inch unit of the digital micrometer can be produced with a single type of screw. Moreover, it is not necessary to separately prepare a sleeve marked with a graduation in millimeter unit and a sleeve marked with a graduation in inch unit, thereby reducing the production cost.

<Modifications>

Incidentally, the scope of the present invention is not limited to the above exemplary embodiments, but includes modifications and improvements as long as an object of the present invention can be achieved.

Figure 10:
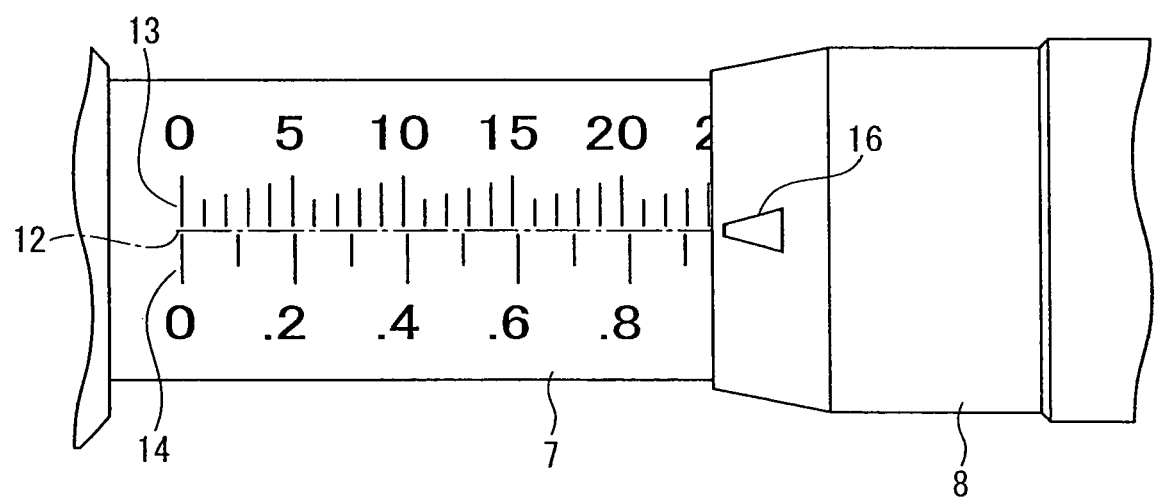
FIG. 10 is a drawing showing a sleeve graduation and a thimble graduation of a second exemplary embodiment of the invention.

Although the inch reading thimble graduation 15 for reading inch unit is axially provided on the outer circumference of the thimble 8 in the above exemplary embodiment, a base mark 16 (shown in FIG. 10) may be provided instead of the inch reading thimble graduation 15. The base mark 16 is triangular and is provided at the position "0" of the inch reading thimble graduation 15. Accordingly, when the base mark 16 meets the imaginary base line 12 of the sleeve 7, the thimble 8 is rotated integer times, so that the millimeter graduation 13 can be read with high accuracy.

Figure 11:
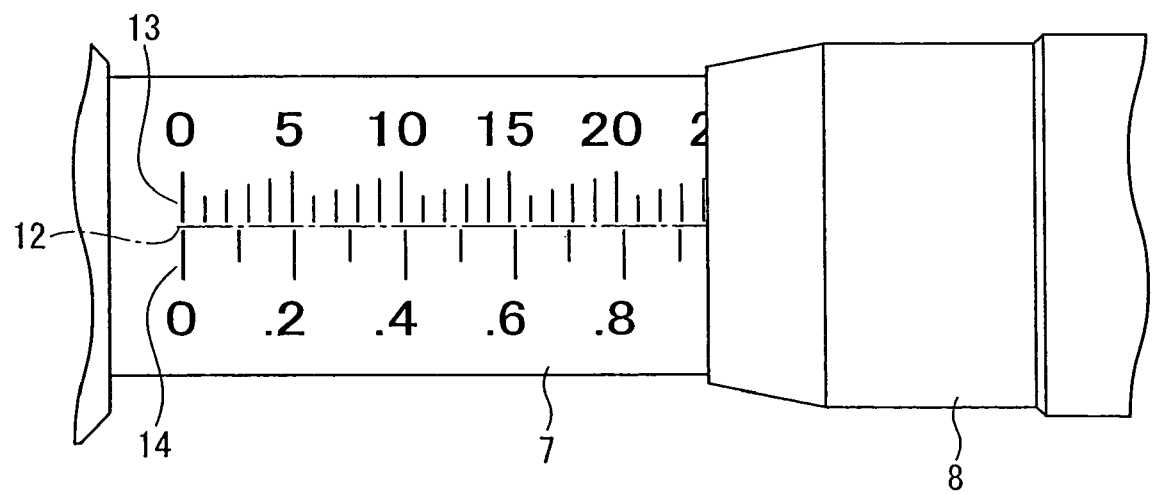
FIG. 11 is a drawing showing a sleeve graduation and a thimble graduation of a third exemplary embodiment of the invention.

Alternatively, as shown in FIG. 11, the outer circumference of the thimble 8 may not be provided at all with the inch reading thimble graduation 15, the base mark 16 and the like. In this case, the displacement of the spindle 4 is read in millimeter or inch unit by a sleeve graduation 11 (the millimeter graduation 13 and the inch graduation 14) at which an end of the thimble 8 is positioned.

Although a screw of 0.5 mm pitch is used for the screw 4A of the spindle 4 in the above exemplary embodiment, the screw may be provided with different pitches. For example, a screw of 0.25 mm or 1 mm pitch may be used.

Although the millimeter graduation 13 and the inch graduation 14 of the sleeve graduation 11 are respectively axially provided in 1 mm pitch and 0.1 inch pitch on the outer circumference of the sleeve 7, the graduations may be provided at different pitches. For example, the millimeter graduation 13 may be of 0.5 mm pitch and the inch graduation 14 may be of 0.2 mm pitch.

Although the inch reading thimble graduation 15 is axially provided at an interval of 28.8 degree on the outer circumference of the thimble 8, the inch reading thimble graduation 15 may be provided at different pitches.

Although a metric screw thread of 0.5 mm pitch is used as the screw 4A of the spindle 4 in the above exemplary embodiment, an inch screw thread may be used instead of a metric screw.

Figures 12, 13:
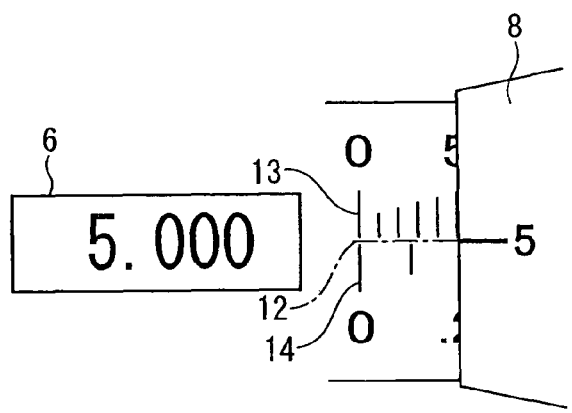
FIG. 12 is a drawing corresponding to FIG. 4 in which an inch screw is used for a screw in the above exemplary embodiments of the invention.
FIG. 13 is a drawing showing confirmation of display when an inch screw is used for a screw in the above exemplary embodiments of the invention.

For example, FIG. 12 shows an angle of the millimeter graduation points (5 mm, 10 mm, 15 mm . . . ) from the base mark of the millimeter reading thimble graduation when an inch screw thread of 0.025 inch pitch is used.

Accordingly, the erroneous display in millimeter can be checked by providing the millimeter reading thimble graduation and a code "5" at an angular position of "314.65 degree" from the base mark of the thimble 8, and the millimeter reading thimble graduation and a code "10" to an angular position of "269.29 degree" from the base mark of the thimble 8. For example, as shown in FIG. 13, the thimble 8 is rotated seven times and further rotated at a predetermined angle to match "5" of the millimeter reading thimble graduation to the imaginary base line 12 corresponding to the position "5" of the millimeter graduation 13. At this time, it is judged that there is no erroneous display when the displayed value of the digital display unit 6 is "5.000" mm. Otherwise, it is judged that the displayed value is erroneous.

Incidentally, the erroneous display in inch can be checked, for example, by a digitally displayed value when the edge of the thimble 8 is matched with any of the sleeve graduations (the inch graduation 14).

Any digital encoder that detects the rotation of the rotor 5A relative to the stator 42 may be used for the encoder 5, which is not limited to the electrostatic encoder mentioned in the exemplary embodiment. For instance, an optical encoder and an electromagnetic encoder may alternatively be used.

Although the digital displacement measuring instrument is exemplified by the digital micrometer 1 in the above exemplary embodiment, the present invention can be applied to the other measuring instrument. For example, the invention may be applied to a digital micrometer head.

The entire disclosure of Japanese Patent Application No. 2008-126116, filed May 13, 2008, is expressly incorporated by reference herein.

What is claimed is:

1. A digital displacement measuring instrument, comprising:
  a main body;
  a spindle that has a screw screwed in the main body to be displaced in an axial direction;
  an encoder that detects a displacement of the spindle;
  a digital display unit;
  a display controller that converts the displacement of the spindle detected by the encoder either to a millimeter unit or to an inch unit and displays a converted displacement on the digital display unit;
  a sleeve that is fixed on the main body to receive the spindle therein; and
  a thimble that is fitted over the sleeve and is connected to the spindle, wherein
  a millimeter graduation that displays the displacement of the spindle by the millimeter unit and an inch graduation that displays the displacement of the spindle by the inch unit are axially provided on an outer circumference of the sleeve, an imaginary base line axially extending on the outer circumference of the sleeve is interposed between the millimeter graduation and the inch graduation, and at least one of the millimeter graduation and the inch graduation includes a plurality of major graduations and sub-graduations, the major graduations being provided with figures representing the displacement, and the sub-graduations equidistantly being disposed in plural between the major graduations and having lengths becoming gradually longer toward the major graduations, and
  a base mark that meets the imaginary base line when the thimble is rotated a whole number of times is provided on the outer circumference of the thimble.

2. The digital displacement measuring instrument according to claim 1, wherein
  an inch reading thimble graduation that represents a rotary angle position of the thimble relative to a starting position is circumferentially provided on the outer circumference of the thimble, the rotary angle position corresponding to a decimal part less than an integer of a rotation number of the spindle when the spindle is axially displaced in a predetermined inch pitch.

* * * * *